United States Patent [19]

Rhee et al.

[11] Patent Number: 4,803,460
[45] Date of Patent: Feb. 7, 1989

[54] ANTI-THEFT SYSTEM

[75] Inventors: Dennis W. Rhee, Bloomfield Hills; Sidney R. Fletcher, Franklin, both of Mich.

[73] Assignee: Ford Motor Company, Dearborn, Mich.

[21] Appl. No.: 50,814

[22] Filed: May 18, 1987

[51] Int. Cl.⁴ .............................................. B60R 25/00
[52] U.S. Cl. .............................. 340/63; 70/DIG. 49; 307/10 AT; 340/542
[58] Field of Search ................. 340/63, 64, 542, 543, 340/545, 508, 510, 572; 307/10 AT; 70/252, DIG. 49

[56] References Cited

U.S. PATENT DOCUMENTS

| | | | |
|---|---|---|---|
| 3,629,818 | 12/1971 | Yokohama et al. | 340/64 |
| 3,654,600 | 4/1972 | Yamamoto | 340/52 D |
| 4,233,595 | 11/1980 | Landkammer | 340/542 |
| 4,310,835 | 11/1982 | Sefton | 340/508 |
| 4,427,967 | 1/1984 | Maiocco | 340/52 D |
| 4,449,605 | 5/1984 | Read | 340/64 |

Primary Examiner—Joseph A. Orsino
Assistant Examiner—Jeffery A. Hofsass
Attorney, Agent, or Firm—Paul K. Godwin, Jr.; Clifford L. Sadler

[57] ABSTRACT

An anti-theft system for sensing the removal of an ignition lock assembly from its housing utilizing a grounding switch within the housing that is biased to disconnect an electrical path when the ignition switch is forcibly removed. An associated circuit provides continuous monitoring of the conduction path within the housing when the ignition switch it turned off.

3 Claims, 1 Drawing Sheet

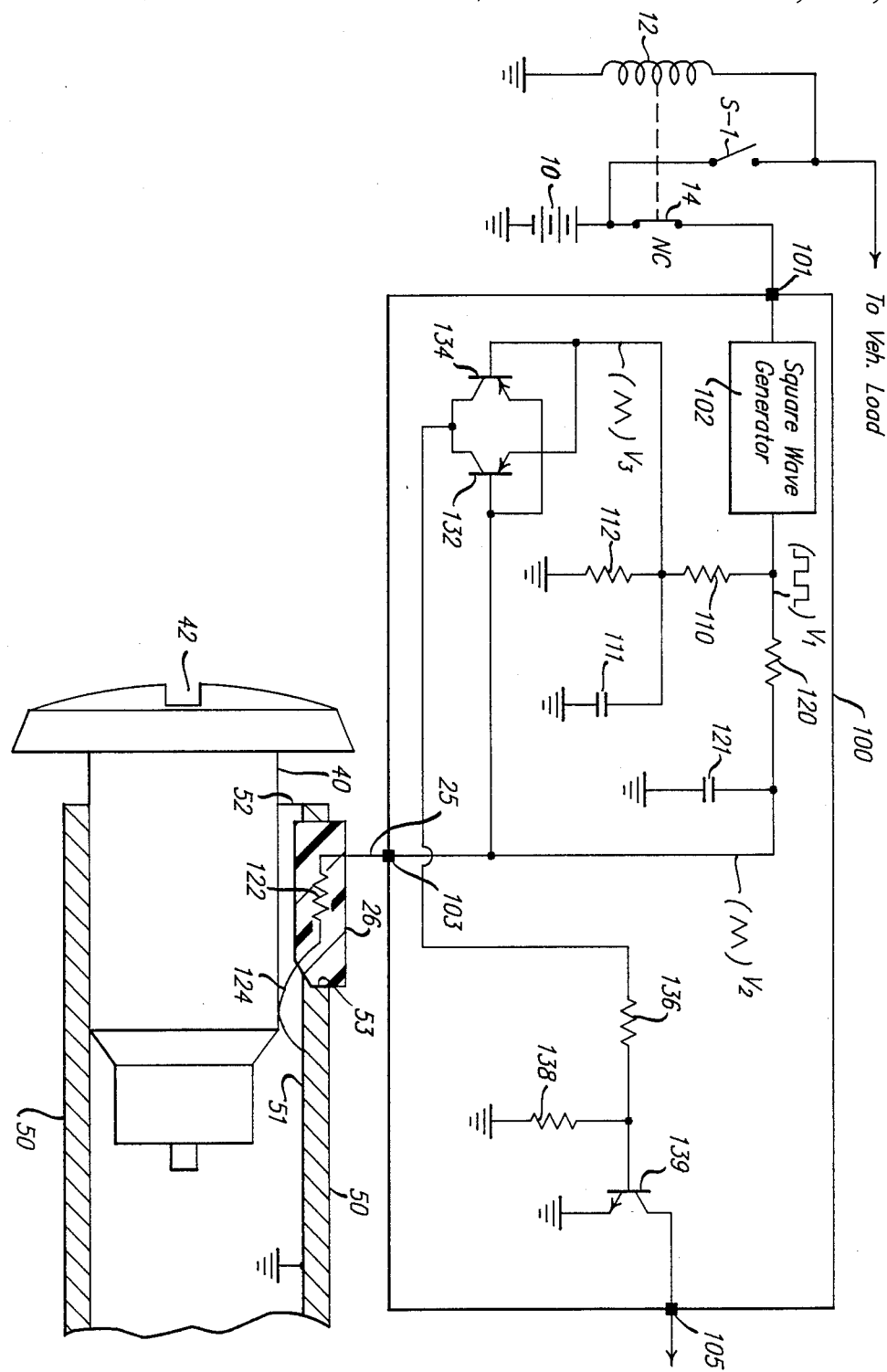

ANTI-THEFT SYSTEM

BACKGROUND OF THE INVENTION

1. Field of the Invention

The present invention is directed to the field of systems for preventing the theft of vehicles and more specifically to the area of sensing the forced removal of a key cylinder from its housing.

2. Description of the Prior Art

Many present day vehicles employ steering shaft locking devices that function to retain the steering mechanism in a fixed position when the ignition is turned off and the ignition key is removed from its lock/switch. Such systems are somewhat effective in the preventing the theft of vehicles by persons attempting to merely electrically bypassing the ignition switch to start the engine, since the lock steering column prevents maneuverability of the vehicle after being started. However, it is well known that once thieves enter a vehicle containing a steering locking mechanism, they will sometimes use hammers and pulling devices to destroy the lock retaining mechanism and remove the lock assembly from the steering column in order to release the steering mechanism locking device, gain access to the actual ignition switch and start the engine.

SUMMARY OF THE PRESENT INVENTION

The present invention is intended to provide a system which senses the removal or tampering with the locking cylinder such as is commonly found on the steering column of a vehicle.

The present invention also provides a system whereby the forced removal of a lock cylinder from its lock housing is detected.

The present invention further provides an anti-theft system whereby the associated circuitry provides a monitoring signal to a sensor switch within the lock housing, at least when the ignition key switch is turned off.

The present invention additionally provides a circuit for monitoring the closed condition of an associated sensor switch and outputs a signal in the event the sensor switch is altered from its closed condition.

The present invention also provides a tampering or removal sensor module which includes a known electrical resistance in series with a switch element that is held closed by the element to be monitored against removal.

DETAILED DESCRIPTION OF THE PREFERRED EMBODIMENT

In the accompanying FIGURE, a metal lock housing 50 is shown as being electrically connected to ground. The housing 50 is generally cylindrical in cross-section and contains an opening 52 into which a key lock assembly 40 is inserted for retention. (The retention mechanism may be of any conventional type and is not shown as being a part of the present invention.)

The lock assembly 40 is shown as containing a key hole aperture 42 into which a conventional key may be inserted for unlocking and rotation to actuate a conventional ignition switch, as would commonly be found on an automotive vehicle. A resilient spring contact 124 is electrically and mechanically connected to a resistor 122, as is shown extending from a molded insulating member 26. A portion of the resilient contact member 124 extends from the insulating member 26. The insulating member 26 is positioned within an aperture 53 formed in the housing 50 and is retained therein.

A portion of the resilient contact 124 extends within the housing 50 and is formed so as to be compressed against the internal conducting wall surface of the housing 50 when the lock assembly 40 is properly inserted into the housing. In this manner, the resilient contact member 124 provides a continuous electrical ground to one side of resistor 122 as long as the lock assembly 40 is within the housing 50. Upon forced removal of the lock 40 from the housing 50, resilient member 124 will break contact with the housing 50 causing an interruption in the electrical path through the resistor 122.

Although the circuit 100 is shown herein as providing a continuous monitoring of the condition of the lock assembly 40 when the ignition switch is turned off, it is forseen that the circuit 100 could, in the alternative, be continuously powered independent of the ignition switch.

As shown herein, the circuit 100 receives input power via its terminal 101 through a normally closed relay contact 14 from a battery 10. Ignition switch S-1 is connected in parallel with a normally closed relay contact 14 and also in a conventional manner to supply vehicle power to the various loads of the vehicle when the switch S-1 is closed. In addition, a relay coil 12 is connected between the load end of the switch S-1 and ground to become energized and thereby open the normally closed relay contact 14 when the vehicle ignition switch S-1 is closed. Therefore, when the ignition switch S-1 is open the coil 12 is deenergized and the relay contact 14 becomes closed to supply battery power to the terminal 101 of the monitoring circuit 100.

In the monitoring circuit 100, a square wave generator 102 provides a charging signal V1 that is, in this embodiment, a 12 volt peak to peak square wave having a frequency on the order of 500 Hz. The output of square wave generator 102 is connected to a pair of integrating networks that convert the square wave signal V1 to linearly ramped signals V2 and V3 that are then fed to a comparator, comprising transistors 132 and 134.

The reference integrating network is made up of resistor 110, capacitor 111 and resistor 112. Resistors 110 and 112 form a voltage divider between the output terminal of the square wave generator 102 and ground. The capacitor 111 is connected between the junction of the two resistors 110 and 112 and ground. The junction of the two resistors 110 and 112 and the capacitor 111 is connected to the base of transistor 134 and emitter of transistor 132.

The sensing integration network is formed by resistor 120, capacitor 121 and resistor 122, located integral with the switch 124 in the lock housing 50. A lead wire 25, that is preferrably armored or otherwise protected against tampering, extends between the resistor 122 embedded in the insulating member 26 and a terminal 103 on the circuit 100. Capacitor 121 is electrically connected between the junction of resistors 120 and 122 and ground. The junction is also connected to the base of transistor 132 and the emitter of transistor 134.

In this embodiment, resistors 110 and 120 are equal, capacitors 111 and 121 are equal and resistors 112 and 122 are equal. Therefore, as long as the electrical path of the sensing integration network is maintained, the voltages appearing at the bases of transistors 132 and 134 are equal to the voltages appearing at their emitters.

As such, the transistors 132 and 134 will constantly remain in their high impedance (nonconducting) states.

The collectors of the transistors 132 and 134 are connected to the base of transistor 139 through a voltage divider network formed by resistors 136 and 138. While both transistors 132 and 134 remain in their nonconducting states, the transistor 139 is held in its high impedance state.

In the event the lock assembly 40 is forcibly removed from its housing 50, the electrical path to ground formed by the resilient contact member 124 and the inside surface of the housing 50 is broken and the voltages appearing across the comparator formed by transistors 132 and 134 become unequal. When this occurs, the transistor 139 becomes biased in its low impedance state. At that moment, the terminal 105 on the circuit 100 becomes grounded so that an associated conventional alarm system may be triggered and latched to sound an audible or visible alarm.

Of course, other tampering with the wire 25 which may cause an alternative conducting path to ground or to interrupt the conducting path will also cause an imbalance in the voltages appearing across transistors 132 and 134 that is sufficient to provide an output signal to ground terminal 105.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. An anti-theft lock assembly comprising:

a lock housing having an electrically grounded inner surface and first open end for receiving a lock assembly;

switch means mounted in said housing for closing an electrical path when said lock assembly is received in said housing and for opening an electrical path when said lock assembly is removed from said housing including a resilient spring contact member that is compressed against said grounded inner surface when said lock assembly is received in said housing and a resistor having a predetermined value of resistance in series with said resilient spring contact member; and electrical means connected to said switch means providing a signal to said resistor for sensing any change in the electrical resistance to ground of said switch means and for outputting an alarm signal when the electrical resistance of said switch means exceeds the predetermined value.

2. An anti-theft lock assembly as in claim 1, wherein said resistor and a portion of said spring contact member are encapsulated in an electrically insulating medium.

3. An anti-theft lock assembly as in claim 2, wherein said electrical means includes a signal generating means which provides a square wave voltage signal, a first voltage integration network for integrating said square wave voltage signal by a predetermined factor, a second integration network, which includes said resistor of said switch means, for integrating said square wave by the same predetermined integration factor and comparing means connected to receive the integrated signals output from said first and second integration networks and outputting said alarm signal when said integrated signals are not equal.

* * * * *